United States Patent
Zhang et al.

(10) Patent No.: US 10,613,316 B2
(45) Date of Patent: Apr. 7, 2020

(54) MEMS LIGHT VALVE, PIXEL ARRAY AND DISPLAY APPARATUS

(71) Applicant: BOE TECHNOLOGY GROUP CO., LTD., Beijing (CN)

(72) Inventors: Bin Zhang, Beijing (CN); Jikai Yao, Beijing (CN); Tingting Zhou, Beijing (CN); Xuefei Sun, Beijing (CN); Xinxing Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 83 days.

(21) Appl. No.: 15/922,306

(22) Filed: Mar. 15, 2018

(65) Prior Publication Data

US 2019/0086660 A1     Mar. 21, 2019

(30) Foreign Application Priority Data

Sep. 19, 2017     (CN) .......................... 2017 1 0846921

(51) Int. Cl.
| | |
|---|---|
| *G02B 26/00* | (2006.01) |
| *G02B 5/18* | (2006.01) |
| *G02B 26/02* | (2006.01) |
| *G09G 3/22* | (2006.01) |
| *G02B 26/08* | (2006.01) |
| *G02F 1/1362* | (2006.01) |

(52) U.S. Cl.
CPC ......... *G02B 26/007* (2013.01); *G02B 5/1828* (2013.01); *G02B 26/02* (2013.01); *G02B 26/023* (2013.01); *G02B 26/0833* (2013.01); *G09G 3/22* (2013.01); *G02F 2001/136222* (2013.01); *G02F 2202/32* (2013.01)

(58) Field of Classification Search
CPC ........ G02B 5/28; G02B 6/0066; G02B 26/02; G02F 1/133514

USPC .................... 359/230–233, 237, 242; 349/70
See application file for complete search history.

(56) References Cited

U.S. PATENT DOCUMENTS

| 8,526,096 B2 * | 9/2013 | Steyn ..................... G02B 26/02 |
| | | 359/233 |
| 2016/0161650 A1 * | 6/2016 | Taraschi .................. G02B 5/28 |
| | | 349/70 |

FOREIGN PATENT DOCUMENTS

| CN | 104360559 A | 2/2015 |
| CN | 104943614 A | 9/2015 |

OTHER PUBLICATIONS

First Chinese Office Action dated Jun. 25, 2019, received for corresponding Chinese Application No. 201710846921.3.
Second Chinese Office Action dated Aug. 15, 2019, received for corresponding Chinese Application No. 201710846921.3.

* cited by examiner

*Primary Examiner* — Audrey Y Chang
(74) *Attorney, Agent, or Firm* — Kinney & Lange, P.A.

(57) ABSTRACT

Embodiments of the present disclosure provide a MEMS light valve, a pixel array and a display apparatus. The MEMS light valve includes a first grating including first openings arranged in a matrix; a second grating, parallel to the first grating and including light emitting areas corresponding to the first openings, wherein the second grating is capable of moving with respect to the first grating along a shifting direction parallel to the first grating. Light emitting materials which emit lights having certain wavelengths by means of excitation by external lights are provided on the light emitting areas.

19 Claims, 3 Drawing Sheets

MEMS LIGHT VALVE, PIXEL ARRAY AND DISPLAY APPARATUS

CROSS-REFERENCE TO RELATED APPLICATION

This application claims benefit of the Chinese Patent Application No. 201710846921.3, filed with the State Intellectual Property Office of China on Sep. 19, 2017, which is incorporated herein by reference in its entirety.

BACKGROUND

Field of the Disclosure

The present disclosure relates to the technical field of display, and in particular, to a microelectromechanical system (MEMS) light valve, a pixel array and a display apparatus.

Description of the Related Art

When light rays illuminate on a screen of a display apparatus, reflection of the light rays will influence color gamut and contrast of the display apparatus. Currently, especially for outdoor display techniques, it is an urgent problem in the art to solve how to improve the color gamut and/or contrast of the display apparatus.

SUMMARY

In order to at least partially alleviate the above problem, the present disclosure provides a MEMS light valve, a pixel array and a display apparatus.

In accordance with one aspect of the present disclosure, it provides a MEMS light valve, that includes a first grating, including first openings arranged in a matrix; a second grating, parallel to the first grating and including light emitting areas corresponding to the first openings, wherein the second grating is movable with respect to the first grating along a shifting direction parallel to the first grating, and wherein light emitting materials which emit lights having certain wavelengths by means of excitation by external lights are provided on the light emitting areas.

In an embodiment, the light emitting materials are quantum dot materials or photonic crystal materials.

In an embodiment, the second grating is made from a light absorbing material, or a light absorbing material layer is provided on the light emitting areas, and the light emitting materials are provided on the light absorbing material layer.

In an embodiment, within the light emitting areas, the light emitting materials are provided on a substrate having a capability of reflecting light.

In an embodiment, the first openings are in a strip form, and a strip-shaped isolation area is located between two adjacent first openings.

In an embodiment, the first openings each have an extending direction perpendicular to the shifting direction, and in the shifting direction, a size of each of the light emitting areas is less than or equal to that of each of the isolation areas.

In an embodiment, the second grating further includes second openings provided alternately with at least one light emitting areas.

In an embodiment, the second grating further includes at least one color filter layer structure provided in the second openings.

In an embodiment, the MEMS light valve further includes a color filter layer structure located at one side of the second grating facing away from the first grating.

In an embodiment, the MEMS light valves further comprising a backlight module located at one side of the color filter layer structure facing away from the second grating.

In an embodiment, the MEMS light valve further comprising: a MEMS control device configured to control movement of the second grating with respect to the first grating along the shifting direction.

In accordance with another aspect of the present disclosure, it provides a pixel array, comprising a plurality of pixel units, each of which includes a plurality of sub-pixel units, wherein each sub-pixel unit includes the MEMS light valve as described in any of the above embodiments.

In an embodiment, the pixel array further comprising an external environment sensor configured to detect whether an external environment is in a bright state or in a dark state.

In an embodiment, the pixel array further comprising a controller configured to control working modes of a MEMS control device of the MEMS light valve and a backlight module on a basis of a detection result of the external environment sensor, wherein the MEMS control device is used to control movement of the second grating with respect to the first grating along the shifting direction; and the backlight module is located at one side of a color filter film structure facing away from the second grating.

In an embodiment, the working modes comprise a bright state mode and a dark state mode, and in the bright state mode, the backlight module is in a turn-off state, and the MEMS control device controls gray scales of sub-pixels by adjusting sizes of portions of the light emitting areas of the second grating being exposed out from the first openings of the first grating; in the dark state mode, the backlight module is in a turn-on state, the MEMS control device controls the gray scales of the sub-pixels by adjusting sizes of overlapping areas of the second openings of the second grating with the first openings of the first grating, wherein the second openings are arranged alternately with at least one light emitting areas.

In accordance with a further aspect of the present disclosure, it provides a display apparatus, comprising the pixel array as described in any of the above embodiments.

BRIEF DESCRIPTION OF THE DRAWINGS

The above and other objects, features and advantages of the present disclosure will become apparent by description of embodiments of the present disclosure with reference to the accompanying drawings, in which.

DETAILED DESCRIPTION

Figure 1:
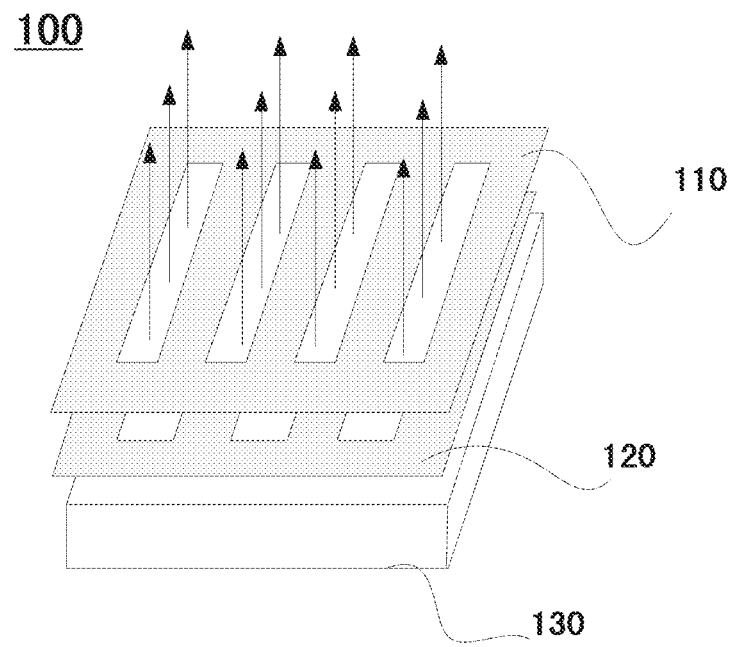
FIG. 1 is a structural view of a MEMS light valve.

Below, illustrative embodiments of the present disclosure will be described with reference to the accompanying drawings. Throughout the drawings, the similar elements are indicated by the same or similar reference numerals. In the following description, some specific embodiments are only intended for purpose of explanation and just some examples thereof, instead of being interpreted to limit the present disclosure in any manner. In order to prevent any obscuring of the present disclosure, the conventional structures or arrangements in the present disclosure are omitted herein. Please be noted that the shapes or scales of the respective components in the drawings are not drawn in a real state, but only schematically illustrating the contents of the embodiments of the present disclosure.

Throughout the specification, references to "one embodiment", "an embodiment", "one example" or "an example" only mean: specific features, structures or characteristics described in conjunction with the embodiment or example will be incorporated within at least one embodiment of the present disclosure. Therefore, the phrases present at any position of the entire specification "in one embodiment", "in an embodiment", "one example" or "an example" are not necessarily referring to the same one embodiment or the same example. In addition, the specific features, structures or characteristics can be combined into one or more embodiments or examples with any appropriate combination and/or sub-combination.

It also should be noted that the skilled person in the art should understand the terms "A is connected with B" and "A is connected to B" in this context can be meant to A directly connected with B or via one or more other components. Furthermore, the terms of "connected to" and "connected with" herein can be physically electrical connection, or electrically coupled or the like.

FIG. 1 is a structural view for showing a MEMS light valve 100. As shown in FIG. 1, the MEMS light valve 100 includes a fixed grating 110, a movable grating 120 and a backlight module 130. The movable grating 120 is located between the fixed grating 110 and the backlight module 130. By moving the movable grating 120, the amount of light emitted from the backlight module 130 to pass through openings in the fixed grating 110 can be controlled, thereby achieving the control of the gray scale corresponding to the MEMS light valve 100. In an example, the movable grating 120 is moved by the MEMS.

However, due to the presence of the light reflection, the lights which is provided by the MEMS light valve 100 as shown in FIG. 1 may have relatively poor contrast, and cannot have high color gamut.

Figure 2A:
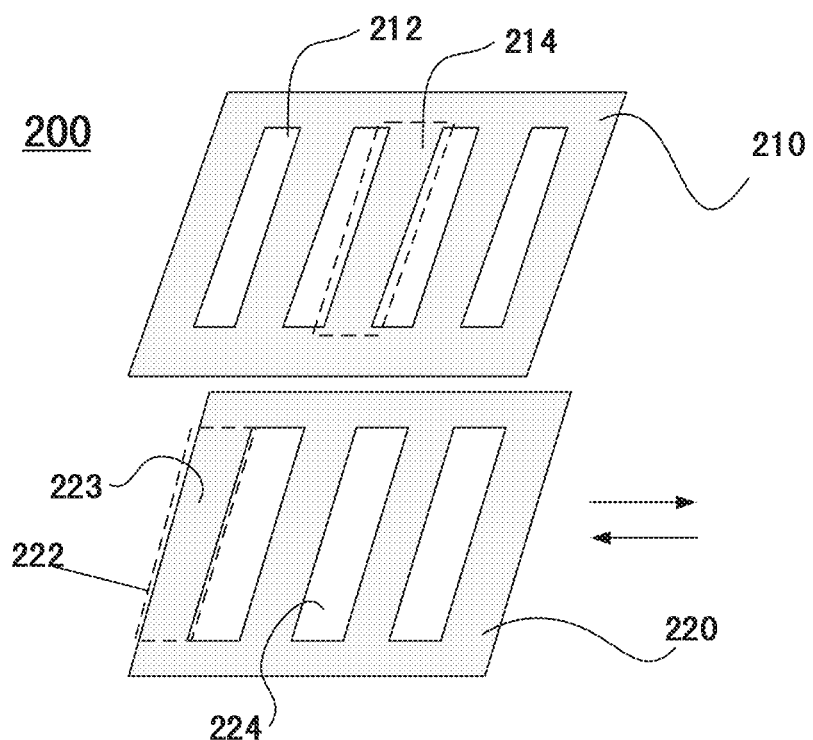
FIG. 2A is a schematic view for showing a structure of a MEMS light valve in accordance with an embodiment of the present disclosure.

FIG. 2A is a schematic view for showing a structure of a MEMS light valve 200 in accordance with one embodiment of the present disclosure. As shown in FIG. 2A, the MEMS light valve 200 includes a first grating 210 and a second grating 220. The first grating 210 has first openings 212 arranged in a form of a matrix. As an example, the form in which the first openings of the first grating 210 as shown in FIG. 2A are arranged is a 1×4 matrix. It should be understood that in other examples, the first openings 212 can be arranged with any other appropriate matrix form, such as, for example, having more lines and/or more or less columns.

Figure 3:
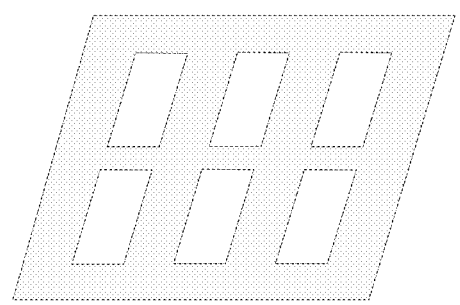
FIG. 3 is a schematic view for schematically showing a first grating having openings arranged in a 2×3 matrix.

For example, FIG. 3 schematically shows a first grating 310 having openings arranged in a form of a 2×3 matrix. For convenience of explanation, the first grating 210 having openings arranged in a form of 1×4 matrix as shown in FIG. 2A will be explained below. The skilled person in the art can understand that the description below is also applicable for other embodiments having different matrix forms.

The second grating 220 is parallel to the first grating 210, and has light emitting areas 222 corresponding to the first openings 212. As shown by arrows, the second grating 220 is movable with respect to the first grating 210 along a shifting direction parallel to the first grating 210. The movement of the second grating 220 with respect to the first grating 210 can be achieved by the MEMS.

The light emitting areas 222 are provided with light emitting materials thereon which can be used to emit light having certain or predetermined wavelengths when being excited by external lights. The external lights can be any lights such as sun light, or light from a lamp, illuminating on a surface of the light emitting areas 222 from the outside of the MEMS light valve.

In one embodiment, the light emitting materials are quantum dot materials. In another embodiment, the light emitting materials are photonic crystal materials. In the following, the two kinds of materials will be set forth in detail respectively.

In the MEMS light valve 200 with the above arrangement, when being illuminated with the external lights, the movement of the second grating 220 in the shifting direction is controlled so that an area with which the light emitting area 222 provided with the light emitting materials is exposed out from the corresponding first opening 212 changes continually. In this way, the gray scale of the light emitted from the light emitting materials changes continuously, and thus this is capable of being implemented as a sub-pixel unit of the display apparatus.

It should be understood that a distance between the first grating 210 and the second grating 220 in FIG. 2A is exaggeratedly shown as a relatively large distance, but this is only for the purpose of illustrating the light valve structure of the present disclosure, instead of limiting the light valve structure in accordance with the embodiment of the present disclosure.

It should also be understood that the correspondence relationship of the first openings 212 to the light emitting areas 222 does not mean both of them have the same size or shape. In the embodiment of the present disclosure, the correspondence relationship only means the correspondence in terms of the number and the position. The first openings 212 and the light emitting areas 222 are in one-to-one correspondence in terms of the number, and the positional relationship thereof is set so that different light emitting areas 222 can be exposed out from the corresponding openings 212 in unison on a basis of the movement of the second grating 220.

In FIG. 2A, the first openings 212 are shown in a strip form, and a strip-shaped isolation area 214 is located between two adjacent first openings 212. In other embodiments, the first openings 212 and the corresponding isolation area 214 therebetween can have other shapes.

In FIG. 2A, the shifting direction is shown as a lateral direction therein, i.e., a direction perpendicular to an extending direction of the first opening 212. However, in other embodiments, similarly, the shifting direction can be set to be other directions.

In one embodiment, in the shifting direction, the size of the light emitting area 222 is less than or equal to the size of the isolation area 214, so that the light emitting areas 222 can be entirely hidden under the isolation area. In another embodiment, the light emitting area 222, the first opening 212 and the isolation area 214 have the same size in the shifting direction. Of course, in other embodiments, the light emitting area 222, the first opening 212 and the isolation area 214 can have other size relationships.

In one embodiment, as shown in FIG. 2A, the second grating 220 further includes one or more second openings 224, which are arranged alternately with one or more light emitting areas 222. When the light emitting areas 222 are hidden under the isolation areas 214, the second openings 224 are exposed out from the first openings 212. As a result, the light coming from underneath the second grating 220 can pass through the second grating 220 and the first grating 210, and be received by the external environment.

In a case of presence of external light (for example at a daytime), the MEMS light valve 200 with such arrangement can expose the light emitting areas 222 out from the first openings 212 and emit light with certain wavelengths by means of excitation of the external light.

In a case that external light is absent (for example at night time), after the light emitting areas 222 are hidden under the isolation areas 214, the second openings 224 are exposed out from the first openings 212. In this way, light is illuminated from a surface of the second grating 220 facing away from the first grating 210 so as to emit light towards the outer environment. In this case, light is illuminated by the backlight module.

Because the MEMS light valve 200 provides light having certain wavelengths in a case that external light is present, when such external light is absent, in order to ensure the consistency of emitted light (so that it would not change the display effect in a whole), it is necessary for light passing through the first openings (from, for example, the backlight module) to have the same wavelength. In one embodiment, this can be achieved by providing a color filter layer or using an LED light source with different colors as backlight.

Figure 2B:
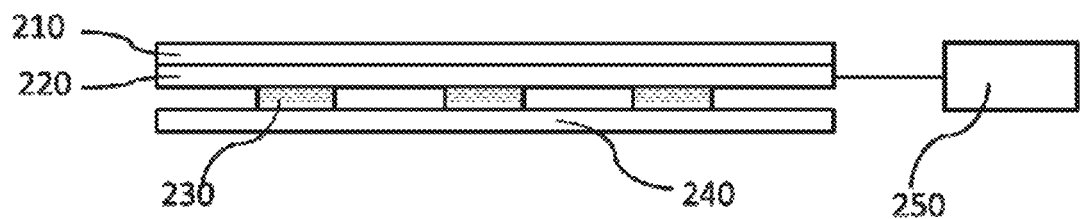
FIG. 2B is a cross-sectional view for schematically showing a MEMS light valve in accordance with an embodiment of the present disclosure.

In a case that a color filter layer is provided, there are two ways of arranging the color filter layer on a basis of the structure of the MEMS light valve 200. Specifically, FIG. 2B is a cross-sectional view for showing a MEMS light valve 200 in accordance with one embodiment of the present disclosure. In one embodiment, a color filter layer structure 230 (a plurality of discrete color filter units) are disposed within each second opening 224 and the second opening 224 is filled with the color filter layer structure. In another embodiment, a color film layer structure (a single color film layer) is provided between the backlight module 240 and the second grating 220. That is, the color filter layer structure 230 is located at one side of the second grating 220 facing away from the first grating 210.

Furthermore, the MEMS light valve 200 further includes a MEMS control device 250, which is used to control the movement of the second grating 220 with respect to the first grating 210 along the shifting direction.

The two cases that the light emitting materials are the quantum dot materials and the photonic crystal respectively, will be described in further detail below.

Quantum Dot Materials

The quantum dot materials will subject to the excited transition, when they are illuminated by light. After the transition, the electrons become unstable and emit photons having energy corresponding to the energy band gap, when they fall back to the previous energy level. Therefore, the light emitted from the quantum dot materials by the excitation have certain wavelengths. The emitted light can be achieved to be red light, green light, or blue light or the like by selection of the quantum dot material, and this can achieve high color gamut.

When the quantum dot materials are used as the light emitting materials in the MEMS light valve 200 as shown in FIG. 2A, it is very likely that all the external light illuminated on the quantum dot material might not be absorbed by them. A portion of the light is reflected from the surface of the light valve, and merges together with the excited light emitted from the quantum dot materials. This would adversely influence the contrast of the light emitted from the light valve.

In one embodiment, the light which is not absorbed by the quantum dot materials can be absorbed by a light absorbing material.

In one case, the second grating 220 can be made from the light absorbing material. After passing through the quantum dot materials, the light arrives at the surface of the second grating 220 and is absorbed by the second grating 220 made from the light absorbing material.

In another case, a separate light absorbing material layer 223 can be provided on the light emitting areas 222, and the quantum dot materials are provided on the light absorbing material layer 223. This also can absorb the light passing though the quantum dot materials.

Photonic Crystal

Photonic crystal is an artificial periodic dielectric structure with photonic band gap characteristics. It has a function of selecting wavelength, that is, it is capable of selectively transmitting light with certain wavelengths or reflecting light with certain wavelengths. The color of light transmitted or reflected finally from the photonic crystal material depends on properties such as thickness, materials, and micro-nano array structure (including a period of the array, size of the small holes, topography) of the photonic crystal. The high selectivity of the photonic crystal can also achieve the high color gamut.

When the photonic crystal of the transitivity type is used as the light emitting material in the MEMS light valve 200 in FIG. 2A, it also needs to provide a separate reflection layer on a surface of the light emitting areas, or dispose the surface (substrate) of the second grating 220 with a reflectivity, so that the transmitted lights having certain wavelengths can be reflected back and emit from the light valve.

Figure 4:
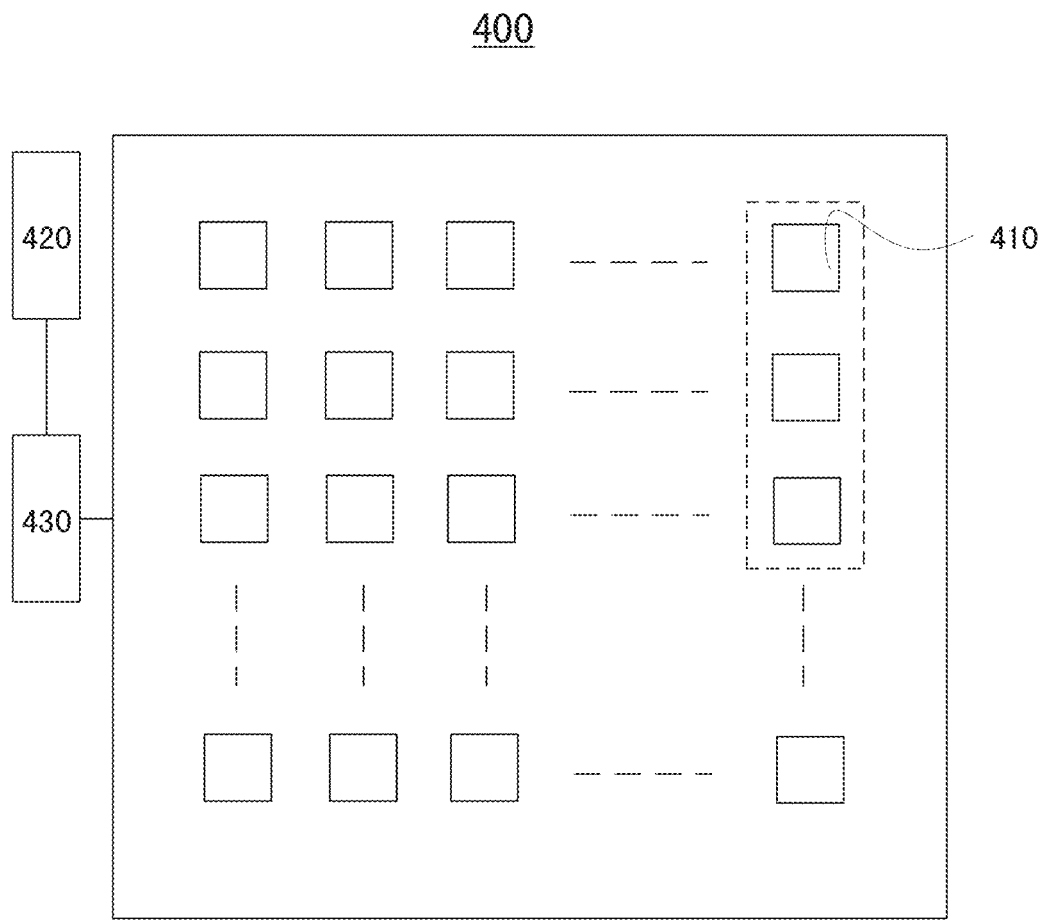
FIG. 4 is a schematic view for showing a pixel array in accordance with an embodiment of the present disclosure.

FIG. 4 is a schematic view for showing a pixel array 400 in accordance with an embodiment of the present disclosure.

As shown in FIG. 4, the pixel array 400 includes a plurality of pixel units (as shown by the dash line border in the figure) arranged in a matrix. Each pixel unit includes a plurality of sub-pixel units 410 (as an example, the pixel unit as shown includes three sub-pixel units). In one example, each sub-pixel unit 410 includes one MEMS light valve 200 as shown in FIG. 2A. As compared with the pixel array of the liquid crystal panel, the MEMS light valves 200 are used as the sub-pixel units in the pixel array 400. When there is external light, the backlight module can be turned off within the pixel array 400. The light is emitted from the light emitting materials under the excitation of the external lights, and thus the pixel array 400 has lower power consumption than the liquid crystal panel. As described above, since the respective sub-pixel units 410 in the pixel array 400 generate the respective primary color lights by making use of the quantum dot materials or the photonic crystal materials, they can achieve higher color gamut and more optimized contrast.

In one embodiment, as shown in FIG. 4, the pixel array 400 further includes an external environment sensor 420. The external environment sensor 420 is used to detect whether the external environment is at a bright state (for example at daytime) or at a dark state (for example at a nighttime), and then to control the MEMS light valve in each sub-pixel unit 410 to emit light by means of the backlight module or the light emitting materials.

In one embodiment, the pixel array 400 further includes a controller 430. The controller 430 will control working modes of the MEMS control devices and the backlight module for the MEMS light valves in each sub-pixel unit 410, on a basis of the detection result of the external environment sensor 420.

Specifically, the working modes include a bright state mode and a dark state mode. In the bright state mode, the backlight module for the MEMS light valves in the each sub-pixel unit 410 is in a turn-off state, and the MEMS control devices will control gray scales of the sub-pixels by adjusting the sizes of the portions of the light emitting areas of the second grating being exposed out from the first openings of the first grating.

In the dark state mode, the backlight module is in a turn-on state, the MEMS control devices will control the gray scales of the sub-pixels by adjusting the sizes of the overlapping areas of the second openings of the second grating with the first openings of the first grating.

The present disclosure also provides a display apparatus, which includes the pixel array 400 as shown in FIG. 4.

The detailed description above has set forth a plurality of embodiments in conjunction with the schematic views, the flowcharts and/or the examples. In a case that such schematic views, flowcharts and/or examples include one or more functions and/or operations, the person skilled in the art shall understand that each function and/or operation in the schematic views, the flowcharts and/or the examples can be implemented singularly and/or jointly by the various structures, hardware, software, firmware, or substantially any combination thereof.

Although the present disclosure has been described with reference to several typical embodiments, it should be understood that the terms used herein is only for explanation and illustration, instead of limiting the present disclosure. The present disclosure can be implemented with various forms without departing from the spirits or scope of the present disclosure, and thus it should be understood that the above embodiments are not limited to the above details, but shall be broadly interpreted within the spirits and scope defined by the attached claims. Therefore, various changes and modifications which fall into the scope of the pending claims or equivalents thereof, shall be considered to be covered by the attached claims.

What is claimed is:

1. A MEMS light valve, comprising:
    a first grating, comprising first openings arranged in a matrix; and
    a second grating parallel to and opposite to the first grating, the second grating comprising light emitting areas and second openings which are alternately arranged, wherein the light emitting areas corresponds to the first openings, wherein the second grating is movable with respect to the first grating along a shifting direction parallel to the first grating,
    wherein light emitting materials are provided on surfaces of the light emitting areas facing the first grating, and the light emitting materials are configured to emit light having certain wavelengths by means of excitation by external light which is irradiated to the light emitting materials through the first openings,
    wherein the second openings are hollowed-out portions.

2. The MEMS light valve as claimed in claim 1, wherein the light emitting materials are quantum dot materials or photonic crystal materials.

3. The MEMS light valve as claimed in claim 2, wherein within the light emitting areas, the light emitting materials are provided on a substrate having a capability of reflecting light.

4. The MEMS light valve as claimed in claim 2, wherein the first openings are in a strip form, and a strip-shaped isolation area is located between two adjacent first openings.

5. The MEMS light valve as claimed in claim 1, wherein the second grating is made from a light absorbing material, or
    a light absorbing material layer is provided on the light emitting areas, and the light emitting materials are provided on the light absorbing material layer.

6. The MEMS light valve as claimed in claim 2, wherein the second grating is made from a light absorbing material, or
    a light absorbing material layer is provided on the light emitting areas, and the light emitting materials are provided on the light absorbing material layer.

7. The MEMS light valve as claimed in claim 1, wherein within the light emitting areas, the light emitting materials are provided on a substrate having a capability of reflecting light.

8. The MEMS light valve as claimed in claim 1, wherein the first openings are in a strip form, and a strip-shaped isolation area is located between two adjacent ones of the first openings.

9. The MEMS light valve as claimed in claim 8, wherein the first openings each have an extending direction perpendicular to the shifting direction, and
    in the shifting direction, a size of each of the light emitting areas is less than or equal to that of each of the isolation areas.

10. The MEMS light valve as claimed in claim 1, wherein the second grating further comprises at least one color filter layer structure provided in the second openings.

11. The MEMS light valve as claimed in claim 1, wherein the MEMS light valve further comprises a color filter layer structure located at one side of the second grating facing away from the first grating.

12. The MEMS light valve as claimed in claim 10, further comprising a backlight module located at one side of the color filter layer structure facing away from the second grating.

13. The MEMS light valve as claimed in claim 10, further comprising: a MEMS control device configured to control movement of the second grating with respect to the first grating along the shifting direction.

14. A pixel array, comprising a plurality of pixel units, each of which comprises a plurality of sub-pixel units, wherein each sub-pixel unit comprises the MEMS light valve as claimed in claim 1.

15. The pixel array as claimed in claim 14, further comprising an external environment sensor configured to detect whether an external environment is in a bright state or in a dark state.

16. The pixel array as claimed in claim 15, further comprising a controller configured to control working modes of a MEMS control device of the MEMS light valve and a backlight module on a basis of a detection result of the external environment sensor, wherein the MEMS control device is used to control movement of the second grating with respect to the first grating along the shifting direction; and the backlight module is located at one side of a color filter film structure facing away from the second grating.

17. The pixel array as claimed in claim 16, wherein the working modes comprise a bright state mode and a dark state mode, and
    in the bright state mode, the backlight module is in a turn-off state, and the MEMS control device controls gray scales of sub-pixels by adjusting sizes of portions of the light emitting areas of the second grating being exposed out from the first openings of the first grating; and in the dark state mode, the backlight module is in a turn-on state, the MEMS control device controls the gray scales of the sub-pixels by adjusting sizes of overlapping areas of the second openings of the second grating with the first openings of the first grating, wherein the second openings are arranged alternately with at least one of the light emitting areas.

18. A display apparatus, comprising the pixel array as claimed in claim 14.

19. A MEMS light valve, comprising:

a first grating, comprising first openings arranged in a matrix; and a second grating parallel to and opposite to the first grating, the second grating comprising light emitting areas and second openings which are alternately arranged, wherein the light emitting areas corresponds to the first openings, wherein the second grating is movable with respect to the first grating along a shifting direction parallel to the first grating, wherein light emitting materials are provided on surfaces of the light emitting areas facing the first grating, and the light emitting materials are configured to emit light having certain wavelengths by means of excitation by external light which is irradiated to the light emitting materials through the first openings, wherein the second openings are hollowed-out portions, and wherein a light absorbing material layer is provided on a side of the light emitting materials away from the first grating.

* * * * *